(12) United States Patent
Bontrager et al.

(10) Patent No.: US 6,926,343 B2
(45) Date of Patent: Aug. 9, 2005

(54) LOCK ASSEMBLY FOR A FOLD-DOWN BED DOOR

(75) Inventors: Evan James Bontrager, Goshen, IN (US); Ryan Christopher Brenneman, Elkhart, IN (US); Steve Lynn Brenneman, Nappanee, IN (US); Ryan Scott Miller, Elkhart, IN (US)

(73) Assignee: Nappanee Window, LLC., Nappanee, IN (US)

( * ) Notice: Subject to any disclaimer, the term of this patent is extended or adjusted under 35 U.S.C. 154(b) by 0 days.

(21) Appl. No.: 10/726,317

(22) Filed: Dec. 2, 2003

(65) Prior Publication Data

US 2005/0116501 A1    Jun. 2, 2005

(51) Int. Cl.[7] .................................................. B60P 3/39
(52) U.S. Cl. .................... 296/174; 296/169; 296/26.14
(58) Field of Search ........................ 296/169, 172–174, 296/165, 176, 26.1, 26.14, 26.01, 26.15, 296/50, 57.1, 146.8; 49/394; 292/DIG. 23

(56) References Cited

U.S. PATENT DOCUMENTS

| | | | | |
|---|---|---|---|---|
| 3,511,529 A | * | 5/1970 | Cutsinger | .................... 296/23 |
| 3,558,180 A | * | 1/1971 | Algire | ........................ 296/174 |
| 3,632,153 A | * | 1/1972 | Knudsen | ...................... 296/169 |
| 3,811,723 A | * | 5/1974 | Anderson | ................. 296/26.11 |
| 4,072,337 A | * | 2/1978 | Barker | ........................ 296/163 |
| 4,842,325 A | * | 6/1989 | Irelan | ..................... 296/146.11 |
| 5,324,092 A | * | 6/1994 | Burg | ........................ 296/180.1 |
| 6,007,142 A | * | 12/1999 | Gehman et al. | ............. 296/171 |
| 6,135,539 A | * | 10/2000 | Bailey et al. | ................ 296/169 |
| 6,550,838 B2 | * | 4/2003 | Bobbitt et al. | ................. 296/52 |

* cited by examiner

Primary Examiner—D. Glenn Dayoan
Assistant Examiner—Greg Blankenship
(74) Attorney, Agent, or Firm—R. Tracy Crump (57) ABSTRACT

A lock assembly for use with conventional fold-down bed doors of recreational vehicles is disclosed. The lock assembly draws the bed door down into proper contact with the door seal, as well as, securely locking the bed doors in their vertical closed position. The lock assembly includes a lock cylinder, a rotor, latch part and key. The lock cylinder is mounted to the bed door, with the rotor journaled inside. The latch part is operatively connected to the rotor so that it moves into progressive contact with a strike plate as the rotor is manually turned by a key. The latch part applies force against the inner edge of the strike plate to draw the bed door down against the door seal ensuring proper seating and closure of the bed door.

9 Claims, 9 Drawing Sheets

LOCK ASSEMBLY FOR A FOLD-DOWN BED DOOR

This invention relates to a lock assembly for a fold-down bed door used in recreational vehicles, and in particular a lock assembly that can draw the bed door down into proper engagement with a door seal, as well as, securely locking the door in its closed vertical position.

BACKGROUND OF THE INVENTION

Recreational vehicles of all types and classes are outfitted with a variety of features and conveniences. Fold-down bed doors are a common feature of recreational vehicles, particularly motor homes and towable trailers. Fold-down bed doors are hinged platforms that are built into interior or exterior walls of the vehicle or trailer so that the platform can pivot to an open horizontal "bed" position or a closed vertical "stowed" position. In the open horizontal position the platform may act as a bed or table. Typically, fold-down bed doors are manually lifted and lowered between the horizontal and vertical positions. Often these fold down platforms are mounted to the exterior of the vehicle as a pop out unit. Exterior fold down units have door seals and gaskets around the door jams and frames which insulate it from the elements.

In recreational vehicle applications heretofore, simple external lock mechanisms have been used to secure fold-down bed doors in their vertical closed positions. These external lock mechanism are not particularly suited for fold down bed doors in recreational vehicle applications. Externally mounted lock mechanisms are aesthetically undesirable and are readily accessible to tampering. In addition, loose pad locks, latches, hooks and other loose external lock parts can damage the laminated exteriors of the bed doors and recreational vehicle sides. Consequently, internal lock mechanisms are desirable in recreational vehicle applications. While desirable, the narrow width and laminate construction of conventional bed doors have made internal lock mechanisms impractical.

Furthermore, the external lock mechanisms commonly used in fold-down bed doors for recreational vehicles simply hold the platform in position and are not particularly suited for bed door applications in recreational vehicles. In addition to lifting a fold-down bed door into its closed vertical position, users must often physically push against the door to properly seat it against the door seal to create a good closure. Since exterior fold-down bed doors can be elevated some distance above the ground, users may have difficulty providing the leverage to push on the door and properly seat it against the door seal. Often bed doors must be properly seated, that is pressed against the door seal sufficient to compress the door seal, before a conventional lock mechanism can be engaged. This fact is an inconvenience when a user must struggle to physically lift and push on the bed door against the door seal while attempting to engage the lock mechanism.

Consequently, an internal lock mechanism that can be incorporated into the narrow laminate construction of a conventional bed door and that can draw a bed door down into proper contact with the door seal, as well as, securely lock the door in its vertical closed position is highly desirable for fold-down bed doors in recreational vehicle applications.

SUMMARY OF THE INVENTION

The lock assembly of this invention is used with conventional fold-down bed doors to draw the bed door down into proper contact with the door seal, as well as, securely lock the bed door in its vertical closed position. Three distinct embodiments of the lock assembly of this invention are described herein. Each lock assembly has a compact design that can be readily incorporated into the narrow construction of conventional fold-down bed doors in recreational vehicle applications. Each lock assembly includes a lock cylinder, a rotor, and a latch part disposed within a hollow rectangular channel, which forms part of the internal frame of the bed door. The lock cylinder is seated within a bore in the bed door and extends into the hollow frame channel. The rotor is journaled inside the lock cylinder. The latch part is operatively connected to the rotor so that it extends and retracts through an opening in the hollow channel to contact a strike plate mounted to the door jam as the rotor is manually turned by a key. The latch part applies force against the inner edge of the strike plate to draw the bed door down against the door seal ensuring proper seating and closure of the bed door.

Accordingly, the lock assemblies of this invention provide several notable advantages over the conventional lock mechanisms used for fold-down bed doors in recreational vehicles, particularly that the lock assembly draws a fold-down bed door into proper contact with the door seal, in addition to securely locking the bed door in its vertical closed position.

Another advantage is that the lock assemblies can be readily incorporated into a narrow laminate construction of a conventional fold-down bed door.

Another advantage is that the lock assemblies provide a tight sealed closure without the user having to physically push the bed door into compressed contact with the seal.

Another advantage is that the lock assemblies can be readily employed into any conventional fold-down bed door application.

Another advantage is that the lock assemblies are mechanically simply, compact, reliable and safe.

Other advantages will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

The preferred embodiments herein described are not intended to be exhaustive or to limit the invention to the precise form disclosed. They are chosen and described to best explain the invention so that others skilled in the art might utilize its teachings.

The figures illustrate three different embodiments of the lock assembly of this invention used for conventional fold-down bed doors. Fold-down bed doors are well known in the recreational vehicle industry. For simplicity of explanation, the invention is described and illustrated in use with a fold-down bed door (designated generally as reference numeral 10) of a trailer. The bed door lock assemblies of this invention are designed and intended for use with fold down bed doors and similar fold-down platforms found on various types and classes of recreational vehicles and cargo trailers. As shown, bed door 10 is mounted to trailer wall 2 and pivots between a closed vertical position and an open horizontal position. Typically, a leaf hinge pivotally connects the bottom of bed door 10 to a door jam 4 mounted within an opening in trailer wall 2. Door jam 4 includes a collapsible seal 6 that extends around the periphery of the jam for sealing the bed door when in its closed vertical position. Two support wires 3 hold the bed door in its open horizontal position, although the bed door can be supported by a variety of other means, including support poles and arms mounted beneath the door. Bed door 10 is a flat rectangular platform constructed from a light weight frame (not shown) and central core material 13 sandwiched between two flat outer skins 12 and 13. The internal frame and core material provide the structural integrity for the platform. Bed door 10 also includes various edge molding and an end flange 14, which abuts against seal 6 when the bed door is in its closed vertical position.

Each embodiment of the lock assembly of this invention is used to draw bed doors down into contact against a door seal, as well as, securely locking the bed doors in their vertical closed position. In each embodiment, the lock assembly is disposed within a hollow channel 16, which forms part of the internal frame of bed door 10. Typically, channel 16 is a rectangular extruded member dimensioned to be disposed within the narrow construction of the bed door (typically 4×¾ inches). Channel 16 provides additional structural support to the bed door and a cavity in which the lock assembly is internally housed. Typically, two lock assemblies are used in a single bed door, each located on opposite sides of the platform. While two lock assemblies are customary, any number of locks may be employed in a single bed door. Also, the lock assembly of each embodiment is used in conjunction with a strike plate 8 mounted to door jam 4. Typically, strike plate 8 has a rectangular opening 9 for receiving the latch component of the lock assembly.

First Embodiment

Figure 1:
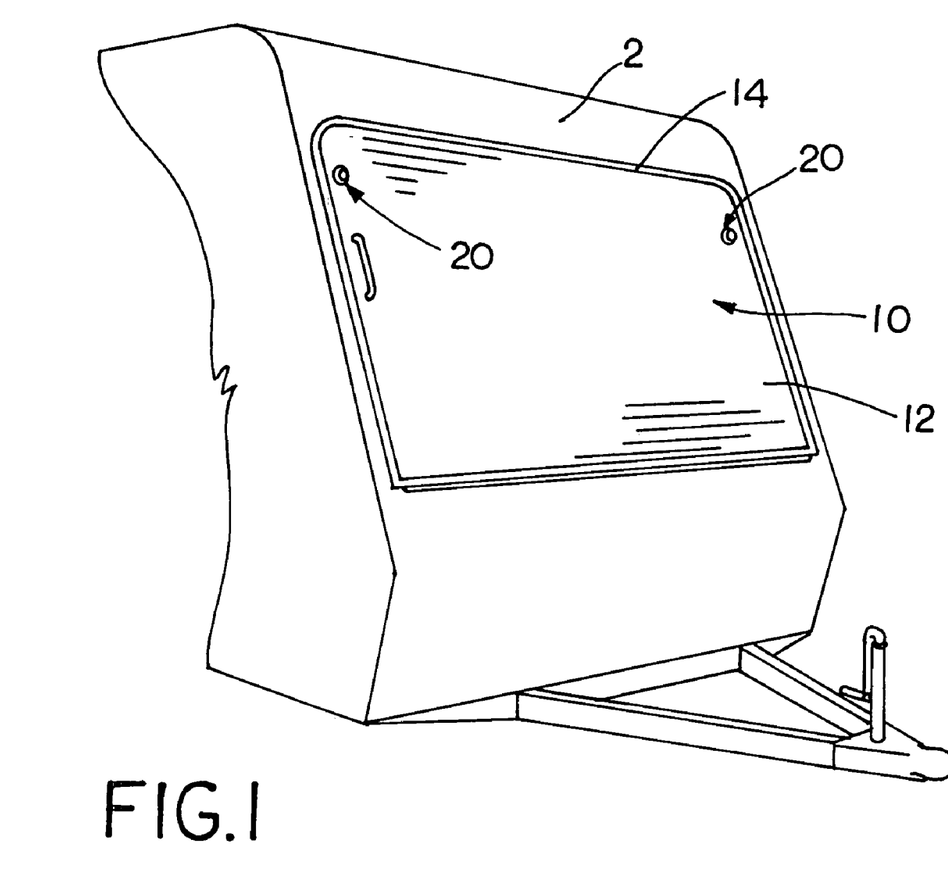
FIG. 1 is a partial perspective view of the front of a fifth wheel trailer having a fold down bed door shown in the closed position.
Figure 2:
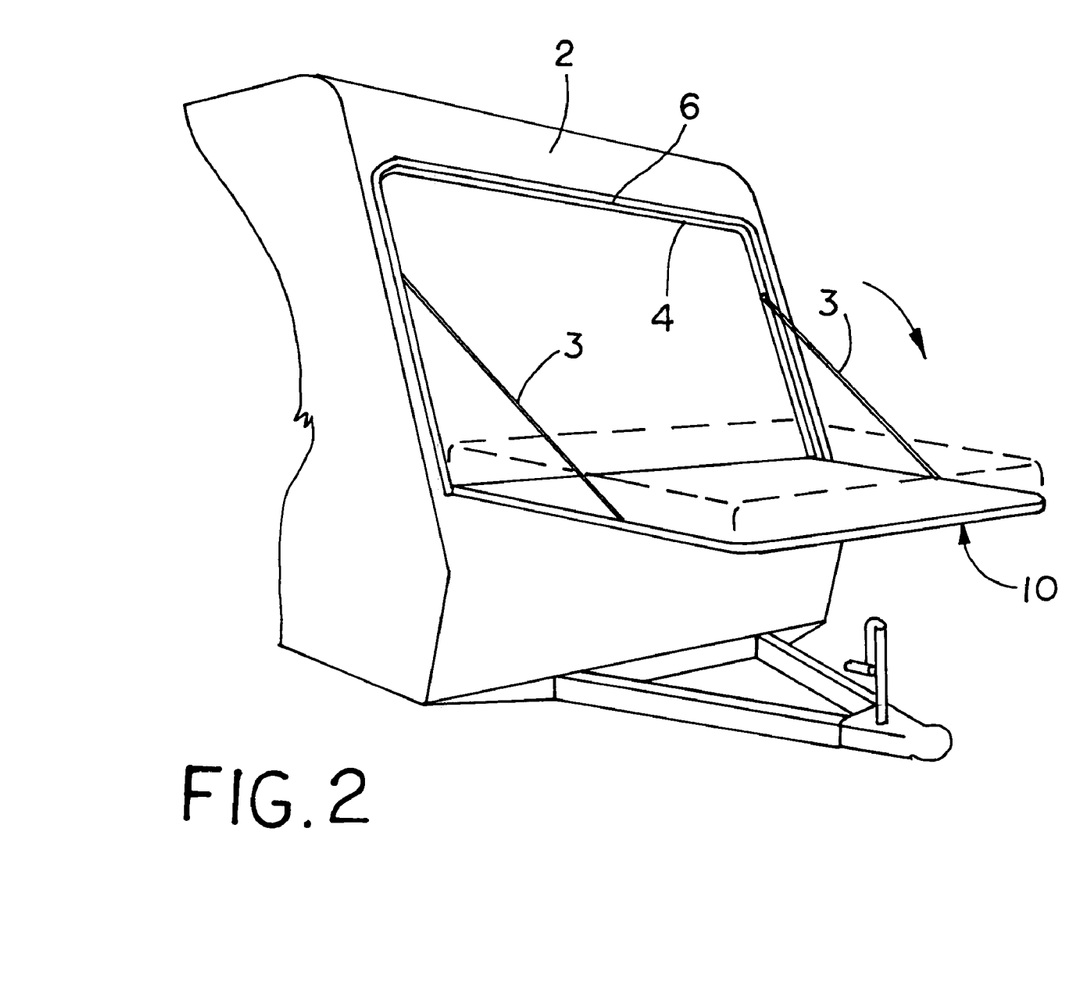
FIG. 2 is a partial perspective view of the front of a fifth wheel trailer having a fold down bed door shown in the open position.
Figure 3:
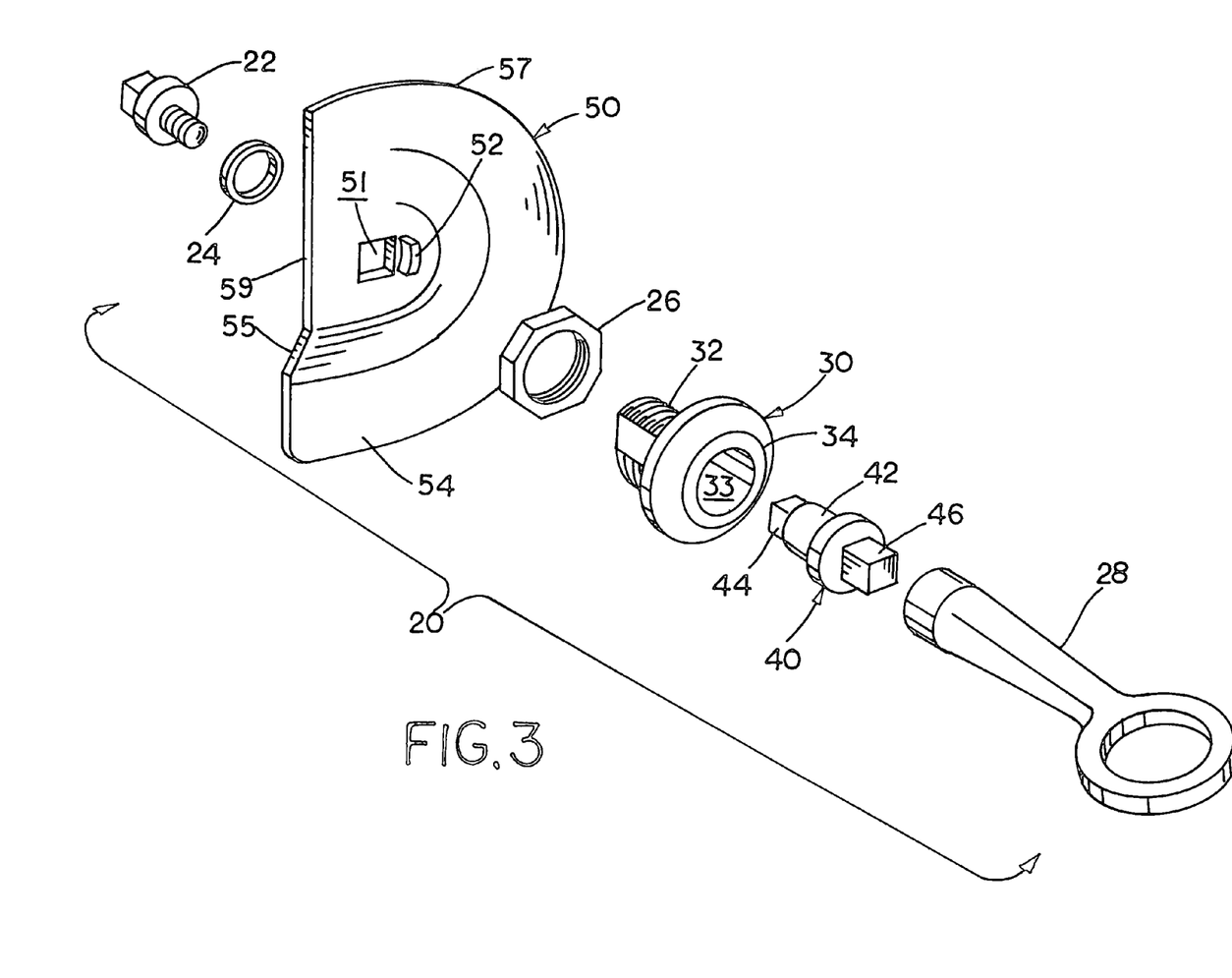
FIG. 3 is an exploded perspective view of the first embodiment of the lock assembly of this invention.
Figure 4:
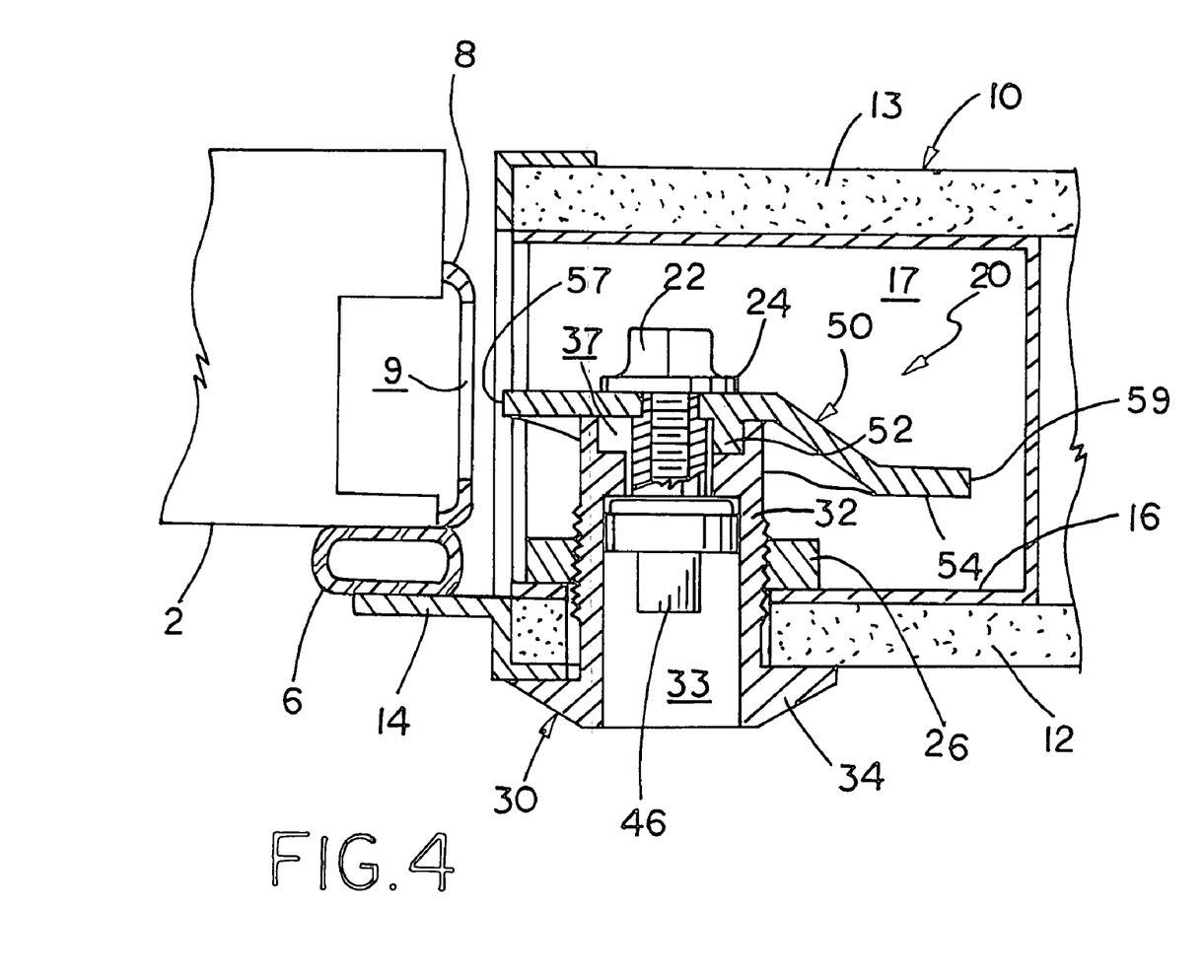
FIG. 4 is a top sectional view of the bed door shown in a closed position and the lock assembly shown in an unlocked position.
Figure 5:
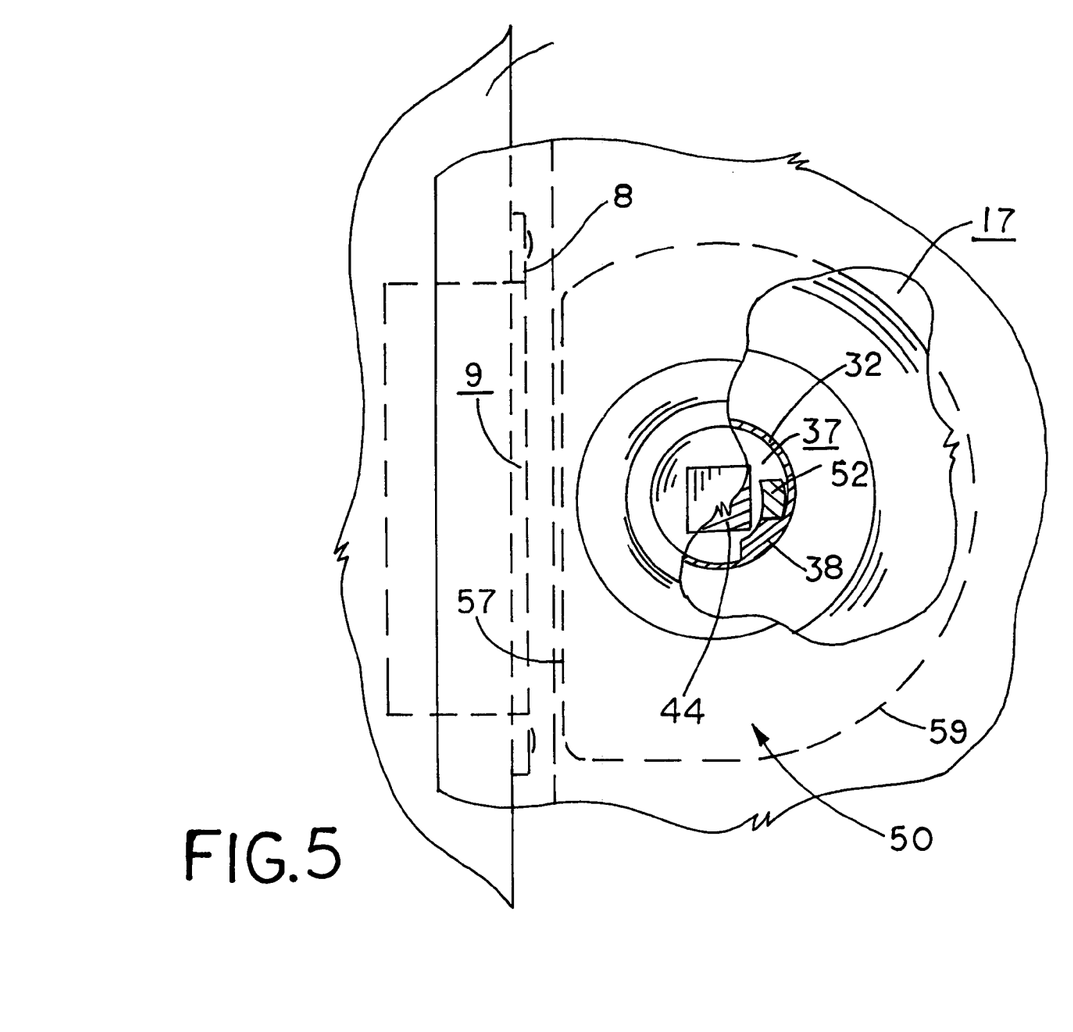
FIG. 5 is a side sectional view of the bed door shown in a closed position and the lock assembly shown in an unlocked position with portions cut away and in shadow.
Figure 6:
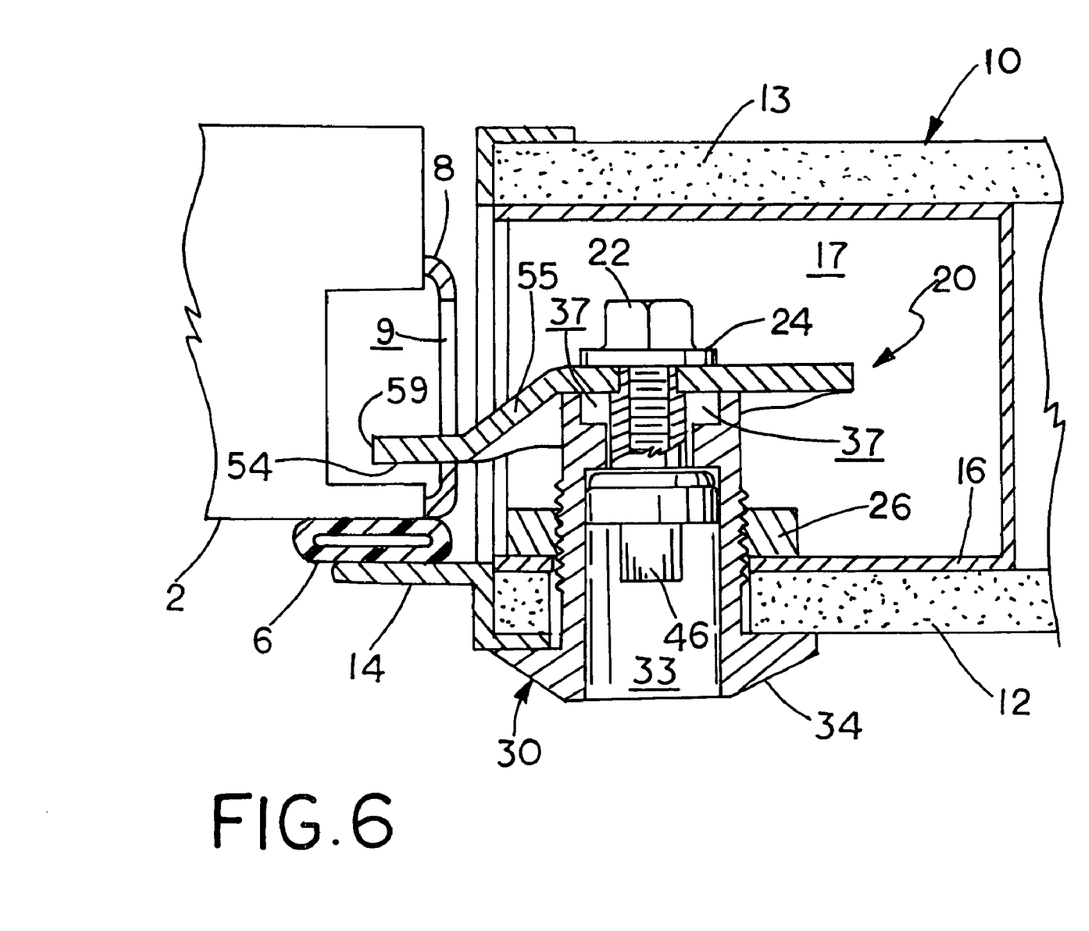
FIG. 6 is a top sectional view of the bed door shown in a closed position and the lock assembly shown in a locked position.
Figure 7:
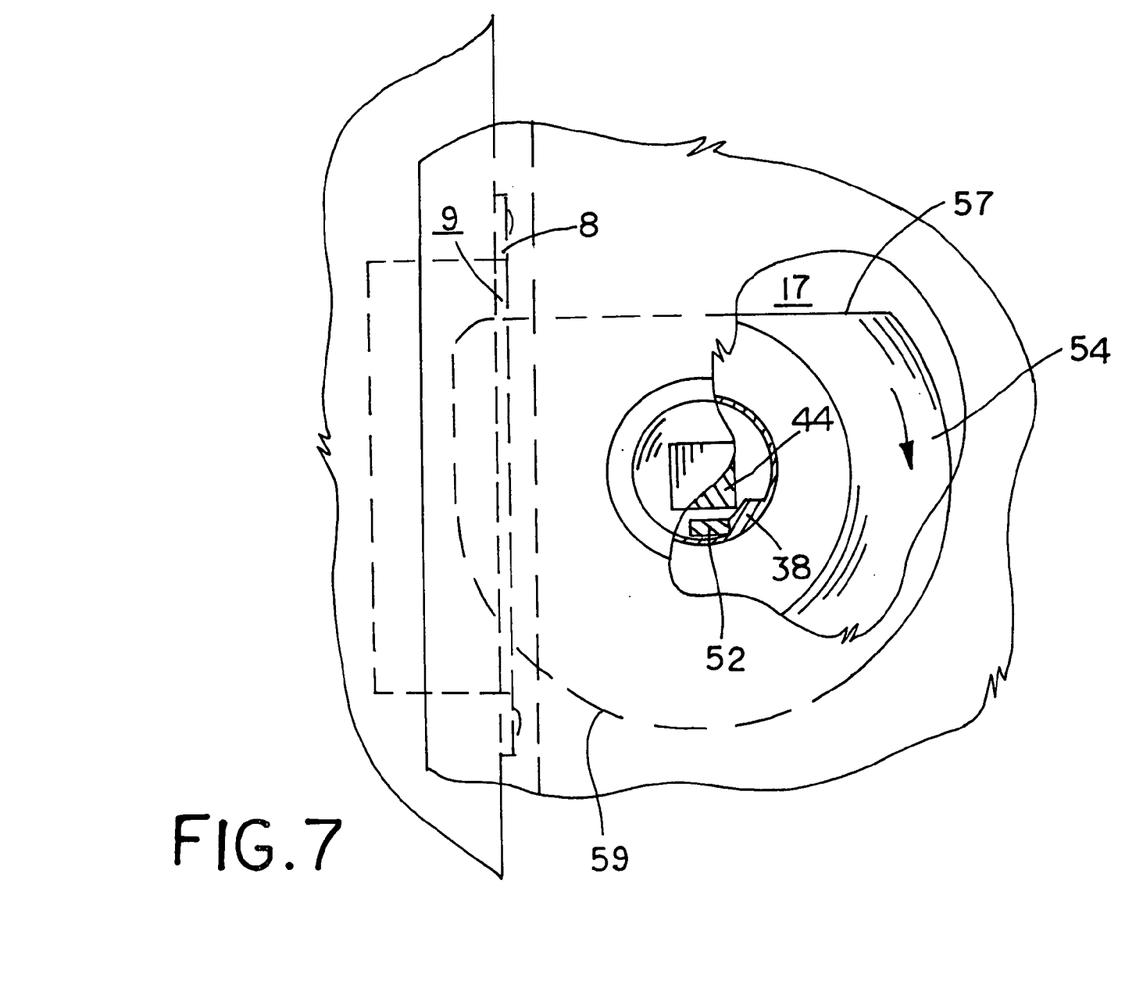
FIG. 7 is a side section view of the bed door shown in a closed position and the lock assembly shown in a locked position with portions cut away and in shadow.
Figure 8:
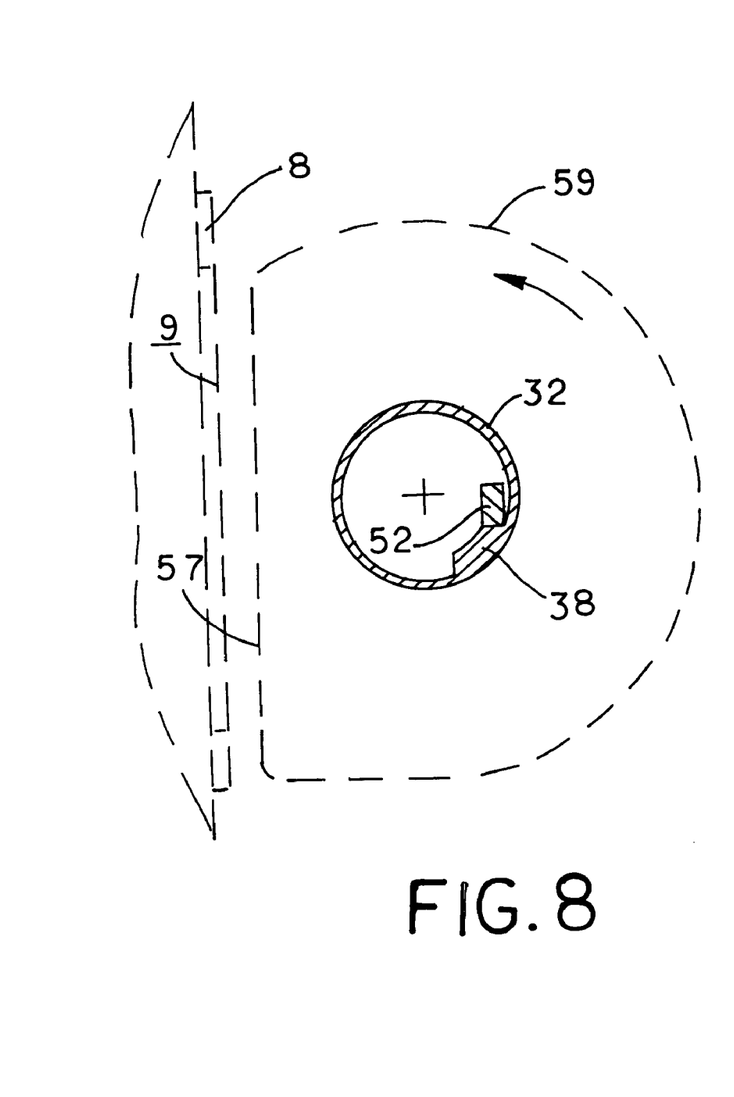
FIG. 8 is another side sectional view of the bed door shown in a closed position and the lock assembly shown in an unlocked position with portions in shadow.
Figure 9:
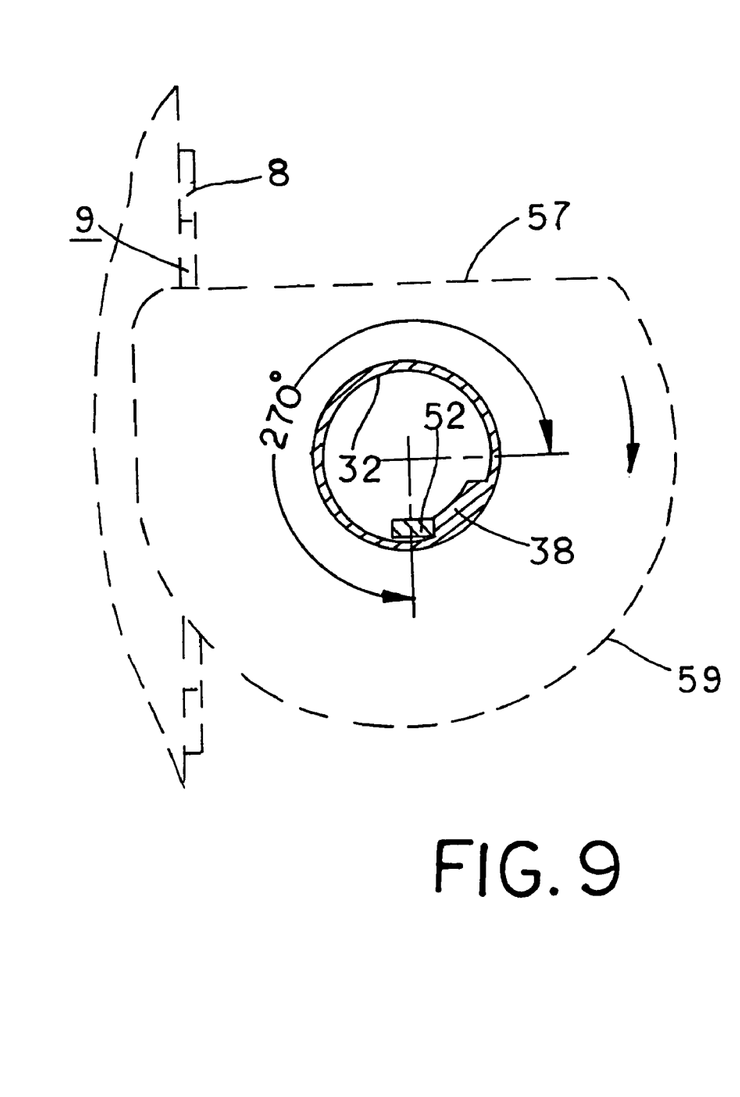
FIG. 9 is another side sectional view of the bed door shown in a closed position and the lock assembly shown in a locked position with portions in shadow.

FIGS. 3–9 show the first embodiment of the bed door lock assembly of this invention, which is designated generally by reference numeral 20. As shown, lock assembly 20 includes: bolt 22; washer 24; lock nut 26; key 28; lock cylinder 30; rotor 40; and latch disc 50. Lock cylinder 30 includes a threaded tubular body 32 that is inserted into a bore in door skin 12 and channel 16 and a beveled annular head 34 that abuts against the outer door skin. Lock nut 26 is turned onto threaded tubular body 32 to secure lock cylinder 30 to bed door 10. Tubular body 32 of lock cylinder 30 defines an axial bore 33 therethrough. As shown in FIGS. 4–6, an internal annular flange 36 extends into bore 33 to provide a shoulder for seating rotor 40. Rotor 40 is seated inside bore 33 for axial rotation within lock cylinder 30. Rotor 40 has a squared end 42 and a squared keyed end 46. Key end 46 abuts against annular flange 36 within bore 33. Square end 42 of rotor 40 is fitted into the square disc opening 51 of latch disc 50. Bolt 22 extends through washer 24 and is turned into a threaded axial bore in the squared end of rotor 40 to secure the latch disc to the rotor. Keyed end 46 of rotor 40 is designed to mate with key 28, which is used to manually turn rotor 40 and latch disc 50 between an unlocked position (FIGS. 4,5 and 8) and a locked position (FIGS. 6,7 and 9). As shown, keyed end 46 has a square head, but any configuration, including but not limited to torx, hex, and slot keys may be employed. Likewise, square end 42 is configured to mate with the square opening 51 of latch disc 50, but any mating configuration may be employed for rotor end 42 and latch disc opening 51. Latch disc 50 is a stamped D-shaped metal plate. Latch disc 50 has a straight edge 57 and a round edge 59. Latch disc 50 is substantially flat except for a joggle 55 that forms an inclined shoulder 54 that spirals outward the length of round edge 59. The subtle acclivity of shoulder 54 begins at one end of rounded edge 59 and terminates at the opposite end of rounded edge 59 spiraling helically about the axis of rotation of the latch disc. A lug 52 protrudes from one side of latch disc 50. As best shown in FIGS. 8 and 9, lug 52 is seated within a channel 38 defined by the space between the sides of lock cylinder body 32 and rotor 40 in the distal end of cylinder head 34. An inward protrusion 38 from cylinder body 32 provides a stop for lug 52, such that rotor 40 and latch disc 50 can be manually turned 270 degrees within lock cylinder 30 between the unlocked and locked positions. As shown, lock assembly 20 is disposed within channel interior 17 so that latch disc 50 will extend into opening 9 of strike plate 8 when rotated from the unlocked position to the locked position. In the unlocked position, straight edge 57 is fully retracting within channel 16 and lies parallel to the plane of strike plate 8 and the side of bed door 10. In the locked position, rounded edge 59 of latch disc 50 extends through the side opening in channel 16.

To secure bed door 10 in its closed vertical position, a user simply lifts the door into place with latch disc 50 in the unlocked position, inserts key 28 into lock cylinder 30 and turns rotor 40 three quarters of a turn (270 degrees) to rotate the latch disc to its locked position. As, latch disc 50 is rotated between the unlocked position to the locked position, latch disc 50 extends from the opening in channel 16 into opening 9 of strike plate 8 so that inclined shoulder 54 contacts with the inner edge of the strike plate opening 9.

The acclivity of the inclined shoulder progressively urges bed door 10 down against seal 6 enough to slightly compress the seal and create a positive contact around the entire door jam 4 as it rotates from the unlocked position to the locked position. Typically, latch disc 50 contacts the inner edge of the strike plate opening 9 midway through its rotational travel to allow for some play in manually shutting bed door 10. To lower bed door 10 to its open horizontal position, a user again inserts key 28 into lock cylinder 30, turns rotor 40 three quarters of a turn (270 degrees) in the opposite direction to rotate latch disc 50 back to its unlocked position and manually lowers the bed door down into position.

ALTERNATIVE EMBODIMENTS

Figure 10:
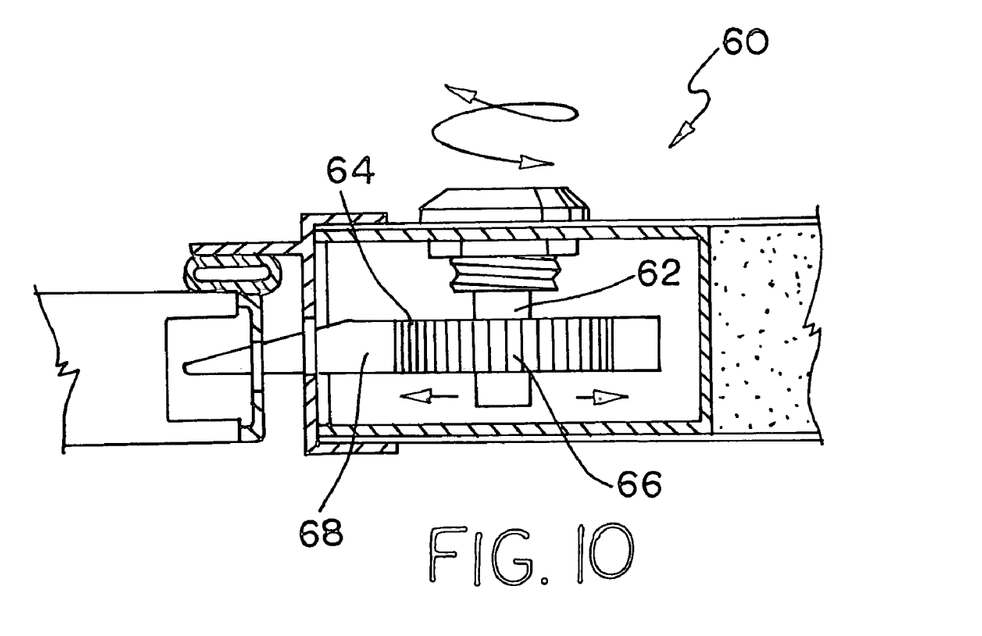
FIG. 10 is a side sectional view of a second embodiment of the lock assembly of this invention.
Figure 11:
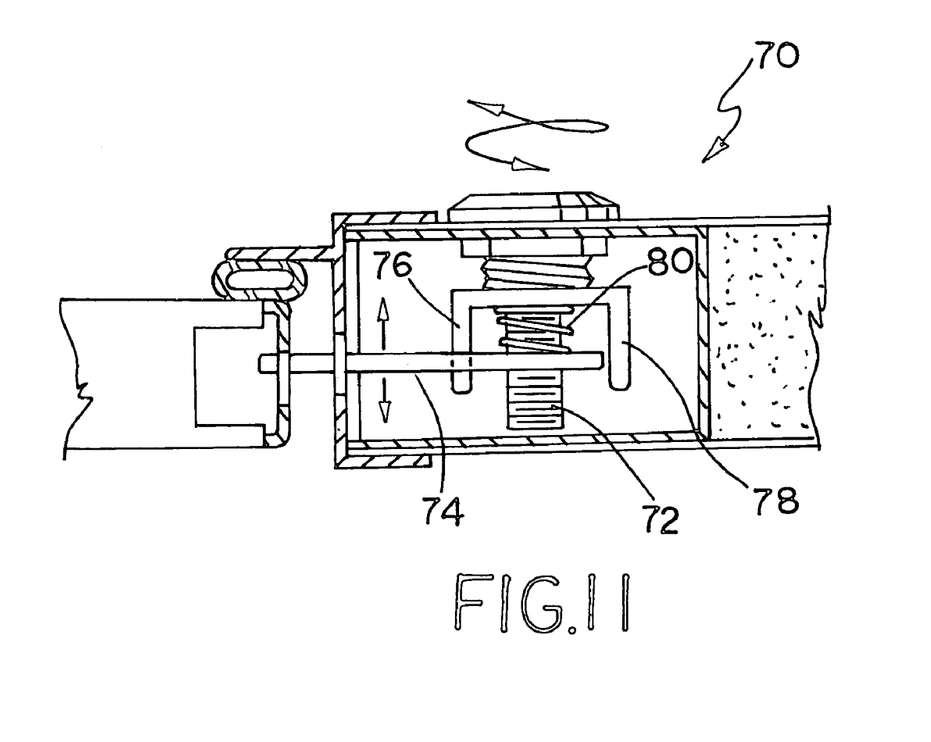
FIG. 11 is a side sectional view of a third embodiment of the lock assembly of this invention.

FIGS. 9 and 10 show two alternative embodiments of the lock assembly of this invention designated as reference numerals 60 and 70 respectively. Both embodiments include a lock cylinder mounted within the channel of the bed door and a rotor journaled within the lock cylinder. In FIG. 9, lock assembly 60 uses a rack 64 and pinion 66 to reciprocate a tapered latch 68 between unlocked and locked positions. Pinion 64 is axially mounted to the end of rotor 62. Manually turning rotor 62 rotates pinion 66 and reciprocated rack 64, which extends and retracts tapered latch 68. As the tapered end of latch 68 extends outward it contacts with the inner edge of the strike plate and progressively draws the bed door down against the seal. The length of the rack 64 limits the extension of latch 68.

In FIG. 10, lock assembly 70 uses a pivoting latch arm 74 mounted to the threaded end of a rotor 72, which is journaled within the lock cylinder. Latch arm 74 pivots approximately ninety degrees between an unlocked position where the latch arm is parallel to the face of the strike plate and a locked position where the latch arm extends perpendicular into the strike plate opening. A pair of stops 76 and 78 limit the rotational movement of latch arm 78. A coil spring 80 is seated over the threaded end of rotor 72 between the cylinder and latch arm 74. When rotor 72 is turned in one direction, latch arm 78 pivots approximately ninety degrees (90°) between stops 78 and 76 to the locked position and then traverses up the threaded shaft of rotor 72. As latch arm 74 traverses up the threaded shaft of rotor 72, it compresses spring 80 and pushes against the inner edge of the strike plate to progressively draw the bed door down against the seal. When rotor 72 is turned in the opposite direction, latch arm 74 traverses down the threaded shaft of rotor 72 biased by spring 80 and moves out of contact with the strike plate. When latch arm 74 moves out of contact with stop 76, it pivots with the rotation of rotor 72 approximately ninety degrees (90°) until contacting second stop 78 to the unlocked position.

Advantages

One skilled in the art will note several advantages of the lock assemblies of this invention for fold-down bed doors used in various recreational vehicles. The lock assemblies of this invention can be incorporated into the narrow construction of conventional bed doors in recreational vehicle applications. The lock assemblies are mounted within a hollow rectangular channel, which forms part of an internal door frame. The door frame channel supports the lock assembly without increasing the width of the bed door and increases the structural integrity of the door.

The lock assemblies also provide a practical function not offered by conventional lock mechanisms. As well as securing a bed door in its closed vertical position within the walls of a vehicle or trailer, the lock assemblies allow the user to draw the bed door down against the door seal to ensure a tight sealed closure. The lock assemblies provide a tight sealed closure without the user having to physically push the bed door into compressed contact with the seal. A user simply uses the key to draw the bed door down onto the door seal once the door is lifted into its closed position. The lock assemblies provide a simple, yet reliable and safe assembly for ensuring that the bed door is held secure in its locked position and ensures that its is seated properly against the door seal.

It is understood that the above description does not limit the invention to the details given, but may be modified within the scope of the following claims.

We claim:

1. A combination comprising a fold-down bed door pivotally mounted to a vehicle sidewall for pivotal movement between a vertical closed position and a horizontal open position, where the vehicle sidewall includes a seal; and     a lock assembly disposed within the bed door for drawing the bed door down against the seal and securing the bed door in its vertical closed position,     the lock assembly includes a latch part and a rotor part,     the latch part disposed within the bed door for reciprocal movement within the plane of the bed door between a locked position where the latch part extends from the bed door and an unlocked position where the latch part is retracted into the bed door, such that the latch part contacts the vehicle sidewall when moved from the unlocked position to the locked position to progressively urge the bed door against the seal and secure the platform in the vertical closed position when the bed door into the closed position,     the rotor part is rotatably seated within the bed door and operably connected to the latch part for extending the latch part from the unlocked position to the locked position when turned in one direction and for retracting the latch part from its locked position to its unlocked position when turned in the opposite direction.

2. The Combination of claim 1 wherein the bed door includes a tubular channel disposed between a first skin and a second skin adjacent the side of the bed door, the channel defining an interior therein, the channel having an opening adjacent the vehicle sidewall, the latch part disposed within the channel interior and extending through the channel opening when moved between the unlocked position and locked position.

3. The Combination of claim 1 wherein the vehicle sidewall includes a strike plate, the latch part contacting the strike plate when the bed door is in its vertical closed position and the latch part is moved between the unlocked position and the locked position.

4. The Combination of claim 1 wherein the latch part is a substantially flat disc rotatably disposed within the bed door for rotation about an axis perpendicular to the plane of the bed door between a first radial position which constitutes the unlocked position and a second radial position which constitutes the locked position,     the latch part having an inclined helical peripheral shoulder whose acclivity spirals helically about the axis of rotation of the latch part, such that the inclined shoulder protrudes from the bed door when the latch part is moved between its unlocked position and locked position and contacts the vehicle sidewall when the bed door is in its closed position.

5. The Combination of claim 3 lock assembly also includes a key adapted to mate with the rotor part so as to facilitate the manual rotation of the rotor part and latch part.

6. The Combination of claim 1 wherein the latch part is an elongated beam having one end with tapered edge, the one end extends from the bed door when the latch part is moved between its unlocked position and locked position so that the tapered edge contacts the vehicle sidewall when the bed door is in the closed position.

7. The Combination of claim 6 where the latch part has a rack, the rotor part includes a pinion operatively mated with the rack.

8. The Combination of claim 1 wherein the rotor includes a threaded shaft, a pair of stops mounted about the rotor, the latch part is an elongated arm having a threaded bore turned onto the threaded shaft, the latch arm rotating with the rotor when the rotor is turned between a first radial position where the latch arm abuts one of the pair of stops which constitutes the unlocked position and a second radial position where the latch abuts the other of the pair of stops which constitutes the locked position, the latch arm traverses along the threaded shaft when the rotor is turned and the latch arm abuts against one of the pair of stops.

9. A combination comprising a fold-down bed door pivotally mounted to a vehicle sidewall for pivotal movement between a vertical closed position and a horizontal open position, where the vehicle sidewall includes a seal and a strike plate; and a lock assembly disposed within the bed door for drawing the bed door down against the seal and securing the bed door in its vertical closed position, the bed door includes a tubular channel disposed between a first skin and a second skin adjacent the side of the bed door, the channel defining an interior therein, the channel having an opening adjacent the strike plate, the bed door having a bore through the first skin and the channel into the channel interior, the lock assembly includes a tubular lock cylinder seated within the bore in the bed door, a latch disc disposed within the channel interior for rotation about an axis perpendicular to the plane of the bed door between an unlocked position and a locked position, disc having a flat peripheral edge and round peripheral edge, the latch disc also having an inclined helical peripheral shoulder along the round peripheral edge whose acclivity spirals helically about the axis of rotation of the latch part, the inclined shoulder protrudes from the channel opening when the latch part is moved between its unlocked position and locked position and contacts the strike plate when the bed door is in the closed position so as to progressively urge the bed door against the seal and secure the bed door in the closed position, a rotor rotatably disposed within the cylinder and axially connected to the latch disc so that the latch disc rotates between the locked position and unlocked position when the rotor is turned, and a key adapted to mate with the rotor so as to facilitate the manual rotation of the rotor part and the latch disc.

\* \* \* \* \*